UNITED STATES PATENT OFFICE.

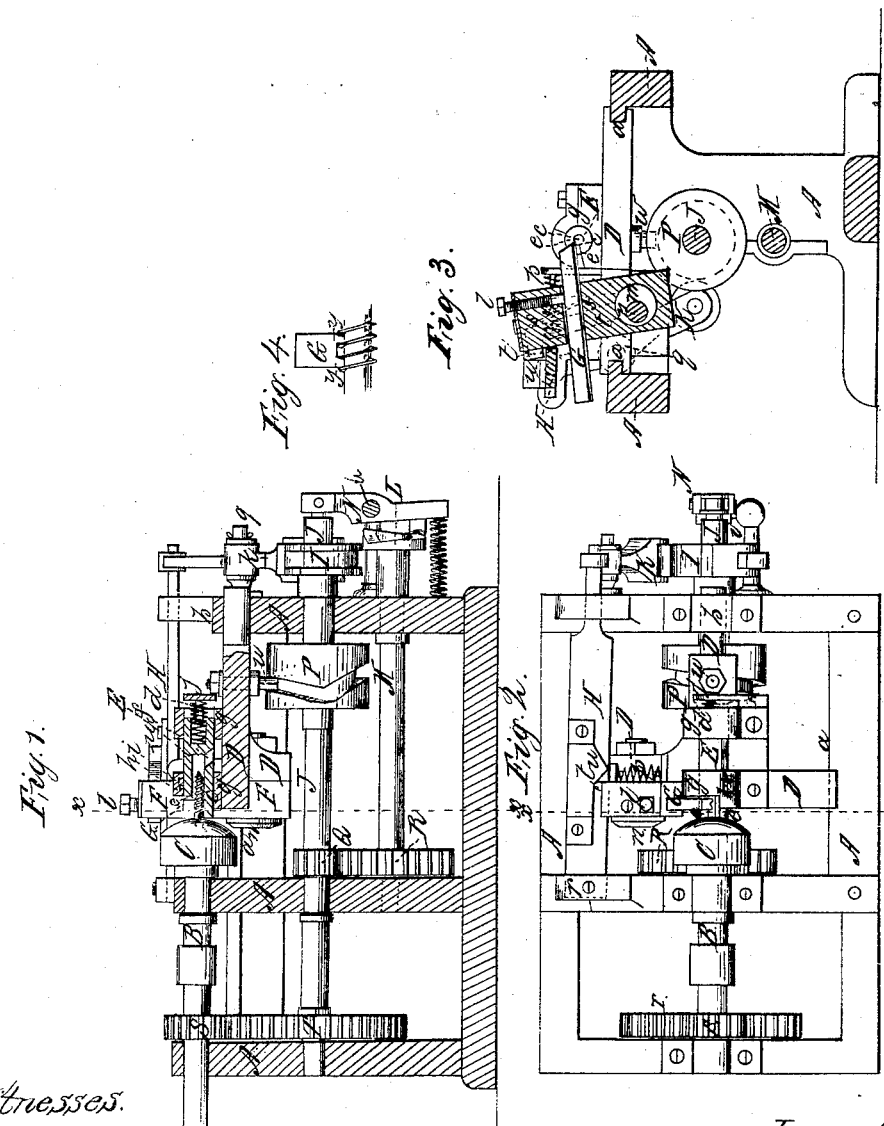

IRA GRIGGS, OF UTICA, NEW YORK, ASSIGNOR TO THE UTICA SCREW MANUFACTURING COMPANY.

IMPROVED MACHINE FOR THREADING SCREWS.

Specification forming part of Letters Patent No. 23,568, dated April 12, 1859.

*To all whom it may concern:*

Be it known that I, IRA GRIGGS, of Utica, in the county of Oneida and State of New York, have invented certain new and useful Improvements in Machinery for Threading Screws; and I do hereby declare that the following is a full, clear, and exact description of the same, reference being had to the annexed drawings, forming part of this specification, in which—

Figure 1 is a longitudinal vertical section of a screw-threading machine with my improvements. Fig. 2 is a plan of the same. Fig. 3 is a transverse vertical section of the same in the plane indicated by the line $x\,x$ in Figs. 1 and 2. Fig. 4 is an end view of the cutter.

Similar letters of reference indicate corresponding parts in the several figures.

My invention consists in a certain mode of applying and controlling the operation of the rest which supports the screw-blanks during the threading operation, whereby better provision is made for the support of the blanks—more especially when they are short—in cutting at or near their points.

It also consists in a certain contrivance for depressing the point of the cutter as it approaches the points of the blanks in such a manner as to make it cut screws with tapering points.

It further consists in a certain construction of the cutter whereby it is made to produce a cleaner cut and a truer thread than the cutter ordinarily employed.

To enable others skilled in the art to make and use my invention, I will proceed to describe its construction and operation.

A is the framing of the machine.

B is the revolving mandrel, to which is attached the chuck C, in which the blanks are held and by which they are caused to revolve to be subjected to the threading operation. This mandrel is supported in a horizontal position in bearings on the top of the framing.

D is the carriage which carries the cutter-stock and the rest, said stock being supported partly on horizontal ways $a\,a$ on the top of the framing and partly in a guide $b$, provided in said framing, and being permitted to slide in a direction parallel with the axis of the mandrel.

E is the rest for the screw-blanks, consisting of a cylinder bored out at one end, as shown at $c\,c$, Fig. 1, of a size to permit the entrance of the screw-blanks, and bored out at the other end to receive part of a spiral spring $d$. This cylinder has also an opening $e\,e$ cut in one side of the mouth of the bore $c\,c$ to admit the cutter and an opening $f$ from the back part of the bore $c\,c$ to permit the escape of chips. It is arranged with its axis directly in line with the axis of the mandrel B and with its bore $c\,c$ toward the chuck C in two guide-boxes $g\,g$, that are secured on the carriage D, and is permitted to slide longitudinally in the said boxes a limited distance, but prevented turning therein by a projection $i$ on one side of it, (shown dotted in Fig. 2,) which fits to a short groove $h$ in one of the boxes $g\,g$. The spring $d$ is applied at the rear of the rest and bears against a plate $j$, which is secured firmly to the carriage, and the said spring is guided partly by entering the rear bore of the rest and partly by being placed on a guide-pin $k$, secured to the plate $j$. The said spring tends to force the rest toward the chuck C; but when by the movement of the cutter-carriage toward the chuck the end of the rest is brought into contact with the chuck the carriage is allowed to continue its movement toward the chuck, and its advance compresses the spring $d$ without interference with the rest, and the consequence of this is that when the cutter-carriage moves away from the chuck to make the next cut the rest remains stationary for a time, or, as it were, runs out from the carriage and keeps the whole length of the blank supported, while the cutter moves a considerable distance toward its point, and when the carriage at last is caused to carry the rest along with it, by reason of the end of the slot or groove $h$ having arrived at the projection $i$, the rest continues to support a much greater portion of the length of the blank than it would have done if it had not been for the sliding motion permitted to it and caused by the application of the spring $d$.

F is the cutter-stock, having the cutter G secured in it by a set-screw $l$. This stock is arranged to vibrate in planes perpendicular to the axis of the mandrel B and rest E by being fitted loosely to an eccentric $m$, which is fitted to turn on a short fixed horizontal axle or pin $n$, which attaches the said stock to the carriage D.

H is a horizontal feed-bar, against which the cutter-stock is pressed back by a strong spring $p$, and by which the cutter-stock is supported during the cutting operation. This feed-bar is arranged to vibrate on a pin $r$, and is made to approach the screw-blank when each cut requires to be commenced by means of a cam I on a shaft J, which is arranged in bearings below the mandrel and cutter-carriage D, said cam operating upon a lever K, which works upon a stationary fulcrum-pin $q$, and which is connected with the end of the feed-bar, and the said bar is drawn back to bring the cutter out of the way of the partly-cut threads previously to every return of the cutter to repeat the cut. The cam I has a movable toe, which is thrown out farther and farther from its center before every repetition of the cut till the threads are cut to the proper depth by the action of a second cam L on another and slower revolving shaft M upon a lever N, which works on a fixed fulcrum $v$, and which is connected with a wedge which is arranged within the cam, and which has a stem projecting from and sliding through the end of the shaft J to connect with the said lever K. The eccentric $m$ is prevented being turned on the fixed pin or axle by the vibrating action of the stock E in feeding up and withdrawing the cutter by means of a lever $t$, attached to the said cam, and a spring $s$, (shown dotted in Fig. 3,) applied within the cutter-stock to press back the said lever, the pressure of the said spring against the said lever preventing the eccentric from turning with the stock as the latter advances toward the screw-blanks, and the bearing of the projecting extremity of the said lever against a guide-piece $u$, secured on the top of the feed-bar, preventing the turning of the eccentric in the opposite direction. The duty of the eccentric $m$ is to produce a slight elevation and depression of the cutter-stock and cutter independently of its vibrating motion to feed and withdraw the cutter, said depressions of the cutter-stock taking place just as the cutter arrives at the point of the screw and being for the purpose of tapering off the point. The movement of the eccentric $m$ for this purpose is produced by the guide-piece $u$, before mentioned, the projecting end of the lever $t$ being held against this guide-piece by the spring $p$, that is applied to the cutter-stock, and the guide-piece having its front edge so formed that the said lever $t$, traveling along it with the movement of the cutter-carriage in chasing the thread, is caused to advance and recede and so turn the eccentric, whose operation on the cutter will be readily understood.

The longitudinal movement of the carriage D is produced by the action of a grooved cam P on the shaft J upon a stud $w$, attached to the said carriage. The shaft J and the mandrel B are geared together by gears S T, which cause the velocity of their respective revolutions to be such as will give the carriage the proper movement relative to the velocity of the revolution of the mandrel to produce the proper pitch of screw. The shaft M is geared with shaft J by gears Q R.

The peculiarity of the cutter G consists in its having two points $y$ $y$ at a distance apart, which causes them to straddle over two turns of the thread and the space between them, as shown in Fig. 4. The points are of the usual form—that is to say, of the form of the spaces between the turns of the thread. By making the cutter of this form I find there is much less liability to produce a chattering cut or a drunken thread.

What I claim as my invention, and desire to secure by Letters Patent, is—

1. So applying the rest E and controlling it by a spring $d$ or its equivalent as to provide for its longitudinal movement in and independently of the carriage, substantially as and for the purposes herein described.

2. Fitting the cutter-stock with an eccentric $m$, operated by means substantially as described, to provide for it a movement for tapering the point of the screw independent of the vibrating movement to feed the cutter in cutting the other portion of the screw, as herein set forth.

3. Though I do not claim, broadly, a two-pointed cutter, I claim the construction of the cutter with two points at such a distance apart as to straddle two turns of the thread and the intervening space, substantially as and for the purpose set forth.

IRA GRIGGS.

Witnesses:
GEORGE S. DANA,
SAMUEL A. HERRICK.